United States Patent
Kell et al.

(10) Patent No.: US 12,138,788 B2
(45) Date of Patent: Nov. 12, 2024

(54) MECHANISM

(71) Applicant: ROLLS-ROYCE plc, London (GB)

(72) Inventors: James Kell, Nottingham (GB); David Alatorre Troncoso, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/736,524

(22) Filed: May 4, 2022

(65) Prior Publication Data
US 2022/0371179 A1    Nov. 24, 2022

(30) Foreign Application Priority Data

May 18, 2021  (GB) ...................................... 2107055

(51) Int. Cl.
*B25J 9/06*    (2006.01)
*B25J 18/06*    (2006.01)
*F01D 21/00*    (2006.01)

(52) U.S. Cl.
CPC .............. *B25J 9/065* (2013.01); *B25J 18/06* (2013.01); *F01D 21/003* (2013.01); *F05D 2260/80* (2013.01)

(58) Field of Classification Search
CPC .. B25J 5/007; B25J 18/06; B25J 9/065; F01D 21/003; F05D 2260/80
USPC ...................................................... 74/490.04
See application file for complete search history.

(56) References Cited

U.S. PATENT DOCUMENTS

| | | | |
|---|---|---|---|
| 4,255,762 A | 3/1981 | Takeyasu et al. | |
| 4,589,818 A * | 5/1986 | Brown | B23Q 7/04 901/17 |
| 6,220,813 B1 * | 4/2001 | Launiere | B23Q 1/626 901/21 |
| 10,670,538 B2 | 6/2020 | Morris | |
| 2010/0191053 A1 | 7/2010 | Garcia et al. | |
| 2011/0034943 A1 | 2/2011 | Churchill et al. | |
| 2014/0114327 A1 | 4/2014 | Boudreaux et al. | |
| 2017/0234734 A1 | 8/2017 | Sakami et al. | |
| 2019/0054638 A1 | 2/2019 | Norton et al. | |
| 2020/0319119 A1 | 10/2020 | Peters et al. | |

FOREIGN PATENT DOCUMENTS

| | | |
|---|---|---|
| EP | 1 380 319 A1 | 1/2004 |
| EP | 2189103 A1 | 5/2010 |
| EP | 3123922 A1 | 2/2017 |
| KR | 10-2015-0044065 A | 4/2015 |
| WO | 2006/053198 A2 | 5/2006 |

(Continued)

OTHER PUBLICATIONS

Oct. 17, 2022 Search Report issued in European Patent Application No. 22171336.5.

(Continued)

*Primary Examiner* — T. Scott Fix
(74) *Attorney, Agent, or Firm* — Oliff PLC

(57) ABSTRACT

A mechanism (30) and a method for inserting an elongate member (35) through an aperture of a body, along a longitudinal axis (35), the mechanism comprising a feed portion (42) comprising a feed actuator (43) configured to engage with and drive the elongate member along the longitudinal axis; and, a twist portion (44) comprising a twist actuator (82) configured to engage with the feed portion and rotate the elongate member about the longitudinal axis.

16 Claims, 10 Drawing Sheets

(56) References Cited

FOREIGN PATENT DOCUMENTS

| WO | 2010/001124 | A2 | 1/2010 |
| WO | 2013/116490 | A1 | 8/2013 |
| WO | 2015/048700 | A2 | 4/2015 |
| WO | 2019/212821 | A1 | 11/2019 |

OTHER PUBLICATIONS

Oct. 18, 2022 Search Report issued in European Patent Application No. 22171337.3.
Sep. 28, 2021, Search Report issued in British Patent Application No. 2107053.7.
Oct. 20, 2021, Search Report issued in British Patent Application No. 2107055.2.
Aug. 28, 2023 Office Action issued in U.S. Appl. No. 17/736,558.
Dec. 8, 2023 Notice of Allowance issued in U.S. Appl. No. 17/736,558.

* cited by examiner

MECHANISM

BACKGROUND

Field of the Disclosure

The present disclosure concerns a mechanism. In particular, the present disclosure concerns a mechanism and a method for inserting an elongate member into an area of interest through an aperture of a body.

Description of the Related Art

Elongate members are known for use in applications where it is necessary to deploy an elongate body into an area of interest through an aperture. Such elongate members may be used to carry out one or more particular tasks within the area of interest. Such tasks may include, for example, supply or removal of matter, or the positioning and orientation of a tool for subsequent in-situ action or inspection. Such elongate members may be of unitary tubular structure, or may comprise one or more joints which enable the elongate member to pivot or flex about a given point. Such joints are utilised in the construction of hyper-redundant manipulators, such as continuum robots and snake arms.

Hyper-redundant manipulators are robots that have a large number of actuated degrees of freedom, and may be used to perform in-situ inspection and/or repair activities in difficult-to-access or hazardous areas. For example, hyper-redundant manipulators may be utilised for inspection or repair of components inside a gas turbine engine. In such an application, access to the interior of the engine is typically gained through an aperture, such as an inspection or borescope port, or through the fan, providing access to an area of interest. The size of the manipulator is therefore limited, and requires manipulator architectures which combine long reach with sufficiently small cross-section to fit through such features. In particular, continuum robots, unlike traditional rigid-link designs, feature a continuous shape with multi-section construction. Due to their unique flexibility, continuum robots can reach places that are usually inaccessible for rigid robots and hostile for human beings. A wide range of applications of continuum robots have been demonstrated in different fields including minimally-invasive surgery and search and rescue.

Known feeding mechanisms for elongate members, such as hyper-redundant manipulators, continuum robots, and snake arms, involve the extension and retraction of the length of the member and are either incorporated within the actuation system of the member itself, or exist as a separate system. However, not all current designs of elongate members are fitted with feeding mechanisms due to the profile and inherent dexterity of their backbones. Examples of feeding mechanisms that are integrated within the actuation systems of the elongate members themselves include pressure-driven soft robots and concentric tube robots, which provide an extending and retracting motion of their limbs. Flexible tubes with different inherent curvatures are rotated and displaced relative to each other to achieve the desired shape and traverse into an environment. The motion is governed by the actuation system which sits on a linear guide and is driven by a capstan drive transmission mechanism.

Examples of feeding mechanisms that exist as independent systems are yet to be well established due to the complexity of combining the actuation system with a feeding mechanism capable of supporting its profile, whilst maintaining an overall compact structure. A known approach is to configure the actuation pack or base of the elongate member such that it is connected to an external feeding or reeling mechanism which allows the entire elongate member to be translated either in the linear or rotational axes. Guide rails and linear stages are usually included to provide the path for the feeding mechanism as well as maintain the stability of the elongate member during its trajectory. As such, existing elongate member feeding mechanisms rely on stages that move the entire actuation pack in the direction of insertion or rotate the actuation pack to spool and unspool the elongate member. These methods in turn rely on having control of the shape of the entire length of the elongate member, making them unsuitable for elongate members with passive sections between an actuated tip and the actuators. Moving the actuation pack is particularly unsuitable for elongate members that exceed a length of approximately one metre, as the propensity of the body to flex and buckle makes it difficult to transmit axial thrust for feeding into an environment.

Previous methods also enable control of the insertion and twist of an elongate member, continuum robot, instrument, borescope, or endoscope by hand—that is to grip the passive section of the instrument and thrust it/twist it into the aperture providing access to the area of interest. Adjustments often require both hands, particularly when acting against gravity. To keep the instrument still, a rubber plug is often used to jam the space between the instrument and the inspection port (in the case or aeroengines) and prevent slip. However, it will be appreciated that manual methods of manipulating long elongate members is inconvenient for many reasons. Such reasons may include that manual manipulation may be physically draining and prone to error; may lack accuracy or repeatability; may require the operator to be present and in close proximity to the target environment which could be impractical or hazardous; and that repeated manual handling of instruments may result in contamination. Furthermore, the act of plugging the gap between the instrument and inspection port to prevent slip of the instrument may cause the instrument to shift, requiring corrective action.

It is therefore desirable to provide a mechanism and a method for inserting an elongate member into an area of interest through an aperture of a body, which solves some or all of the aforementioned problems.

SUMMARY

According to a first aspect there is provided a mechanism for inserting an elongate member through an aperture of a body, along a longitudinal axis, the mechanism comprising a feed portion comprising a feed actuator configured to engage with and drive the elongate member along the longitudinal axis; and, a twist portion comprising a twist actuator configured to engage with the feed portion and rotate the elongate member about the longitudinal axis.

Thus, in this way, the mechanism may quickly and accurately deploy an elongate member into an area of interest with a reduced requirement for manual operator input. In some examples, the feeding mechanism may also enable semi- or fully-automated deployment into the area of interest. In particular, the mechanism may also enable insertion, navigation, and orientation of an elongate member within an area of interest which is inaccessible, or where aligning and moving an actuation pack would be impossible, impractical, or of danger to an operator. The mechanism may also enable remote operation and deployment of the elongate member. The mechanism may also be operated with higher precision than by using manual methods. Thus, in some examples, the mechanism may enable the inspection and/or repair of difficult-to-reach components of gas turbine engines and other high-value aerospace and nuclear assets, which are inaccessible, or where aligning and moving an actuation pack would be impossible, impractical, or of danger to an operator.

Additionally, the mechanism may reduce physical strain on the operator carrying out the inspection. Thus, the mechanism may improve productivity through either or both of reduced time taken to deploy and navigate the elongate member into the area of interest, and reduced operator fatigue. Furthermore, reduced operator induced forces on the equipment, and reduced manual handling, may improve instrument longevity. Thus, in this way, an operator may manipulate the elongate member within the area of interest using electronic control signals and precise actuation, rather than manual hand and arm movements. Control signals may be sent from interface hardware, such as a joystick, either locally or remotely to the area of interest.

The feed actuator may be configured to drive the elongate member along a passageway, the passageway extending through the feed portion and along the longitudinal axis. The twist actuator may be configured to rotate both the feed portion and the elongate member about the longitudinal axis.

Thus, the mechanism may enable elongate members comprising, for example, one or more tubes, probes, hyper-redundant manipulators, continuum robots, snake arms, borescopes, or endoscopes, to be inserted and controlled within a body or environment such as, for example, an aeroengine, nuclear reactor, the human or animal body, or a geological feature. The elongate member may comprise any one or more of the above examples. The body may comprise any one or more of the above examples.

The twist actuator may be configured to rotate the elongate member about 360 degrees. The twist actuator may be configured to rotate the feed portion about 360 degrees. The twist actuator may be configured to rotate either or both of the feed portion and the elongate member about 360 degrees.

The feed actuator may comprise one or more feeding portions. Each feeding portion may be configured about the passageway to engage with and drive the elongate member along the passageway. Each feeding portion may comprise one or more wheels.

Thus, the or each feeding portion may translate rotational drive of the feeding portion into linear drive of the elongate member. The or each feeding portion may provide either or both of continuous and non-continuous drive. It will be appreciated that many such configurations exist, such as, for example, worm gears, or rack and pinion systems, which may alternatively be used within the or each feeding portion.

Each feeding portion may be configured perpendicularly to the passageway such that a point of engagement between the feeding portion and the elongate member, in use, is parallel to but radially offset from the longitudinal axis.

In use, when the elongate member is inserted into the mechanism, the or each feeding portion may be configured to engage and provide an interference fit with the elongate member. Thus, each feeding portion may be configured to act in unison to accommodate the elongate member therebetween, and drive the elongate member along the passageway.

A tangent of the or each wheel, at the point of engagement between the or each wheel and the elongate member, in use, may be parallel to, but radially offset from, the longitudinal axis.

Accordingly, the or each of the wheels may be configured to rotate in a direction parallel to, but radially offset from, the longitudinal axis. In this way, the radial offset of each of the wheels, between the longitudinal axis and the point of engagement between the wheel and the elongate member, may be equal to or less than one half of the diameter of the elongate member.

Either or both of the feed portion and the twist portion may comprise a sensor.

Thus, the sensor may comprise one or more of, for example, a break-beam presence sensor, encoder, optical tracking circuitry, and a temperature sensor.

The elongate member may comprise a hyper-redundant manipulator. The elongate member may comprise a continuum robot. The elongate member may comprise a snake arm.

The elongate member may comprise one or more of a pipe, cable, cable bundle, optical fibre, or optical fibre bundle. Additionally or alternatively, the elongate member may comprise one or more of an endoscope, a borescope, a laser, and an optical motion sensor.

The mechanism may comprise an attachment means for attaching, in use, the mechanism to a body. The attachment means may be configured to coaxially align the longitudinal axis with an aperture of a body.

It will be appreciated that the attachment means may comprise one or more of a number of known methods for temporarily, or semi-permanently attaching, in use, the mechanism to the body. Thus, according to some non-limiting examples, the attachment means may comprise a body or portion, such as for example, a flange, through which the mechanism may be directly or indirectly coupled, attached, fastened, or bonded to the body. Alternatively, according to some non-limiting examples, the attachment means may comprise a body or portion, such as for example, a flange, which may be directly or indirectly coupled, attached, fastened, or bonded to the body.

The attachment means may be integral to the mechanism. The attachment means may not be integral to the mechanism. The attachment means may comprise one or more of, for example, an adhesive, magnetic, or a suction body, configured to engage with and fix the mechanism to the body. The attachment means may comprise, for example, a mechanical fixing, such as a bolt, nut, or screw, or a body configured to receive a mechanical fixing such as a bolt, nut, or screw which is operable to engage with and fix the mechanism to the body. The attachment means may comprise, for example, a mechanical linkage or body which is operable to engage with and fix the mechanism to the body. The attachment means may be configured to communicate with a further attachment means comprised as part of the body. The further attachment means comprised as part of the body may comprise any one of more of the examples described above.

Thus, the attachment means may enable, in use, the mechanism to be attached to the body, and the longitudinal axis aligned with the aperture of the body, such that the elongate member may inserted into the body. The elongate member may inserted into the body through an aperture of a body. The elongate member may inserted into the body through an opening into the body. The body may be a gas turbine engine. In particular, the aperture may be an inspection or borescope port of the gas turbine engine. The opening into the body may be a spacing between component parts, or through the fan of a gas turbine engine. Alternatively, the body may be, for example, a nuclear reactor. Thus, the aperture may be an inspection or borescope port of a nuclear reactor. The opening into the body may be a spacing between component parts, or through a component part of a nuclear reactor.

The body may be, for example, a satellite or orbiting laboratory. The body may be a pipe or passage, such that the mechanism may enable insertion, navigation, and orientation of the elongate member through underground pipes or passages.

The body may be, for example, a human or animal body. The body may be an orifice, passage, incision, or opening within or upon the human or animal body, such that the mechanism may enable insertion, navigation, and orientation of the elongate member through the human or animal body. Thus, the mechanism may enable insertion, navigation, and orientation of a medical device within the human or animal body in a repeatable and accurate way.

The body may be, for example, a geological body, such as a crevasse or a gap in debris, a geological formation, or an item on or adjacent to the seabed. Thus, the mechanism may enable insertion, navigation, and orientation of the elongate member through underground passages, or in search-and-rescue operations to navigate cameras into crevasses or gaps in debris. Furthermore, the mechanism could be used for underwater exploration by aiding in the deployment of elongate members, such as underwater instrumentation, mining equipment, or continuum robots into an area of interest.

In further examples, the body may be, for example, an aeroplane, a fuselage of an aeroplane, or a refuelling component of an aeroplane. Thus, the mechanism may enable navigation, orientation, and insertion of the elongate member through a refuelling component to manipulate fuel lines for air-to-air or vessel-to-vessel refuelling.

Thus, in the case of a gas turbine engine inspection port, the mechanism may be coupled, attached, fastened, or bonded to a borescope port cover hole. In the case of a nuclear installation the mechanism may be coupled, attached, fastened, or bonded to an inspection port, a valve, or a flange.

According to a second aspect there is provided a method of inserting an elongate member through an aperture of a body, along a longitudinal axis, using the mechanism according to the first aspect, comprising coaxially aligning the longitudinal axis with the aperture of the body; feeding the elongate member along the longitudinal axis through the aperture; and, rotating the elongate member about the longitudinal axis.

The step of rotating the elongate member about the longitudinal axis may be carried out independently from the step of feeding the elongate member along the longitudinal axis. The step of rotating the elongate member about the longitudinal axis may be carried out whilst concurrently feeding the elongate member along the longitudinal axis.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the accompanying Figures, in which.

DETAILED DESCRIPTION

Figure 1:
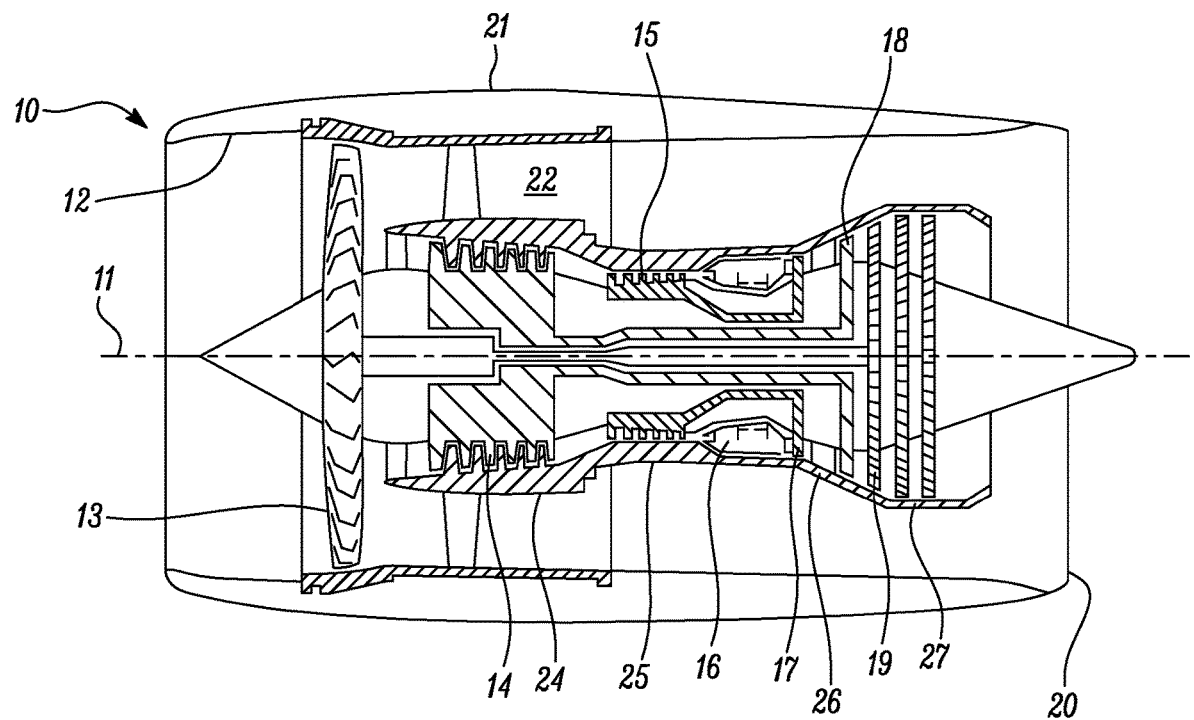
FIG. 1 shows a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be appreciated that during one or more of manufacture, inspection, servicing, or repair of a body, it may be necessary to inspect, carry out an operation, or repair one or more internal surfaces or components within the body, in areas of interest which are otherwise obscured or obstructed from normal view. In such circumstances, it may be beneficial in terms of time and/or cost to carry out such inspections, operations, or repairs without removing components or parts from the body to reveal such areas of interest.

In the case of gas turbine engines, inspection ports or apertures are often built into structures or walls of the engine 10, such that inspection, operational, or repair equipment may be deployed into the area of interest through an aperture of a body. In some instances, inspection, operational, or repair equipment may be deployed into the area of interest through an opening of the body. The opening may, for example, be a gap formed between neighbouring blades at the front end of the engine 10, such as between neighbouring blades of one or more of the propulsive fan 13, intermediate pressure compressor 14, and high-pressure compressor 15. Alternatively, the opening may, for example, be a gap formed between neighbouring blades at the rear end of the engine 10, such as between neighbouring blades of one or more of the high, intermediate and low-pressure turbines 17, 18, 19.

As shown in the arrangement of FIG. 1, a first inspection port 24 is formed within the wall of the intermediate pressure compressor 14; a second inspection port 25 is formed within the wall of the high pressure compressor 15; a third 26 inspection port is formed within the wall of the high pressure turbine 17; and a fourth inspection port 27 is formed within the wall of the low pressure turbine 19. It will be appreciated that the engine 10 may include further inspection ports in alternate areas or walls of the engine 10. It will also be appreciated that two or more inspection ports may be spaced annularly around the walls of the engine 10, in one or more axial locations, as required.

Figure 2:
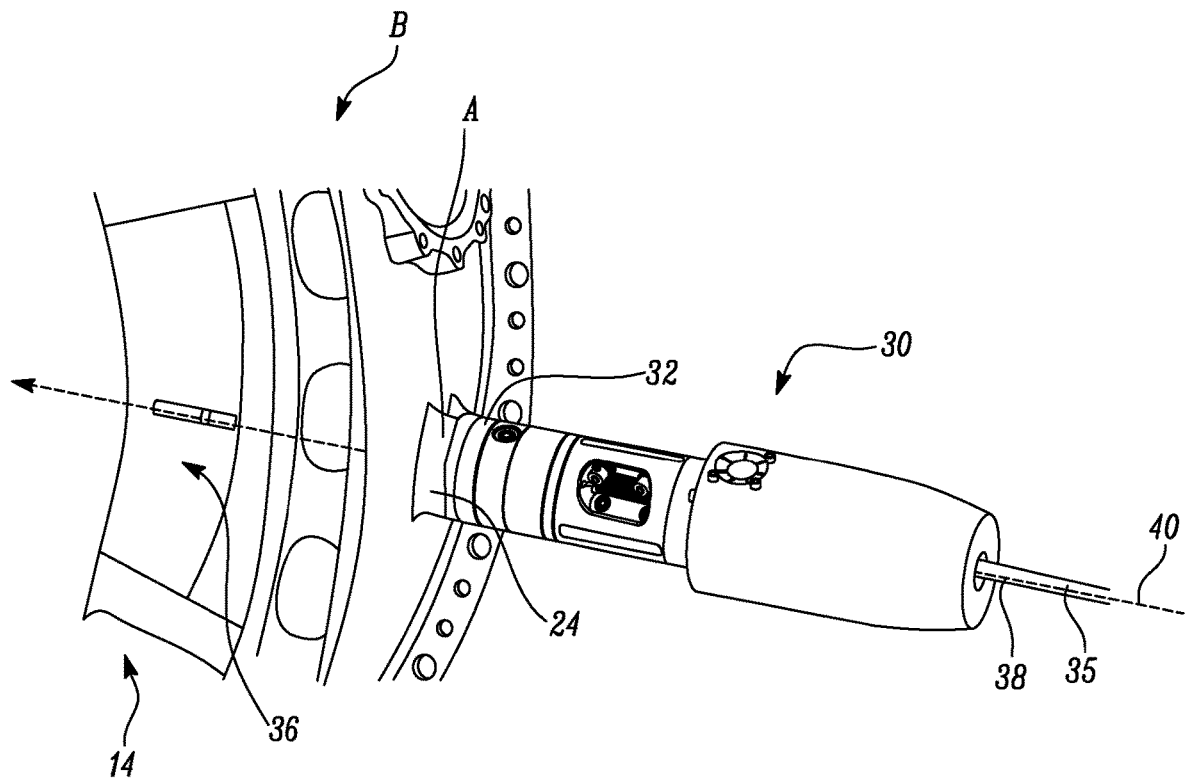
FIG. 2 shows a side perspective view of a mechanism deploying an elongate member into an area of interest through an aperture of a body.

With reference to FIG. 2, the first inspection port 24 is shown, which is formed within the external wall of a nozzle guide vane section of the intermediate pressure compressor 14. A mechanism 30 is shown to be attached to the inspection port 24, in use, via an attachment means AT. In the example shown, the attachment means comprises an integral flange 32 comprising a threaded portion which is fed into a corresponding female receiving portion of the inspection port 24.

It will be appreciated that the example shown depicts one of many possible solutions for attaching the mechanism 30 to a body B, many of which may be considered as viable alternatives for forming an attachment means AT. For example, the mechanism 30 may be attached to the inspection port 24, in use, via an integral flange 32, through which a male fastener is fed into a female receiving portion of the inspection port 24. The attachment means AT may comprise one or more of a number of known methods for temporarily, or semi-permanently attaching, in use, the mechanism to the body B. For example, the integral flange 32 may be directly or indirectly attached, fastened, or bonded to the body B. The attachment means AT may comprise one or more of, for example, an adhesive, magnetic, or a suction body B, configured to engage with and fix the mechanism 30 to the body B. The attachment means AT may comprise, for example, a mechanical fixing, such as a bolt, nut, or screw, or a body B configured to receive a mechanical fixing such as a bolt, nut, or screw which is operable to engage with and fix the mechanism to the body B. The attachment means AT may comprise, for example, a mechanical linkage or body B which is operable to engage with and fix the mechanism 30 to the body B. The attachment means AT may be configured to communicate with a further attachment means AT comprised as part of the body B. The further attachment means AT comprised as part of the body B, or may comprise any one of more of the examples described above. Thus, the attachment means AT may enable, in use, the mechanism 30 to be attached to the body B. In the example shown, the attachment means AT enables, in use, the mechanism 30 to be attached to the inspection port 24, which in the example show, provides an example of an aperture A of the body B. Thus, the body B may be, for example, a gas turbine engine. The body B may be, for example, an inspection port of a gas turbine engine.

Referring again to FIG. 2, a passageway 38 is shown to extend through the mechanism 30 along a longitudinal axis 40, in the direction indicated. Furthermore, the longitudinal axis 40 of the passageway 38 is coaxially aligned with the inspection port 24. Thus, in use, the longitudinal axis 40 of the passageway 38 is coaxially aligned with an aperture A of a body B. Accordingly, the attachment means AT is configured to coaxially align the longitudinal axis 40 with the aperture A of the body B.

An elongate member 35 is shown to extend along the longitudinal axis 40 of the passageway 38. Thus, the elongate member 35 extends through both the mechanism 30 and the inspection port 24 along the longitudinal axis 40 of the passageway 38. Thus, in use, when the elongate member 35 is inserted into the mechanism 30, the elongate member 35 is coaxially aligned with the longitudinal axis 40 of the passageway 38 and an aperture A of a body B. A distal end of the elongate member 35 is shown to have been deployed, in use, through both the mechanism 30 and the inspection port 24, into an area of interest 36. The distal end of the elongate member 35 may actuate or be capable of either or both of independent and controlled actuation relative to the remainder of the elongate member 35. In some examples, the elongate member 35 may comprise one or more of a hyper-redundant manipulator, a continuum robot, a snake arm, a borescope or an endoscope.

In the present example shown, which is configured for inspection of the intermediate pressure compressor 14 of the engine 10, the elongate member 35 comprises a tool configured for monitoring operational health of the gas turbine engine 10. In further examples, the elongate member 35 may comprise, for example, either or both of one or more sensors and tools configured for monitoring or restoring operational health of the gas turbine engine 10. Alternatively, in further examples which are configured for medical applications, the elongate member 35 may comprise, for example, either or both of one or more sensors and tools configured for monitoring or restoring health of the human or animal body. It will be appreciated that the example shown depicts one of many possible application specific elongate member 35 configurations, many of which may be considered as viable alternatives for inclusion within the elongate member 35. Thus, the elongate member 35 may comprise a tool, such as, for example one or more of a camera or laser. The elongate member 35 may comprise a sensor.

The area of interest 36, in the example shown, is an area within the intermediate pressure compressor 14. Thus, the attachment means AT may enable, in use, the mechanism 30 to be attached to the body B, and the longitudinal axis 40 of the passageway 38 aligned with the aperture A of the body B, such that the elongate member 35 may inserted into the body B.

Figure 3:
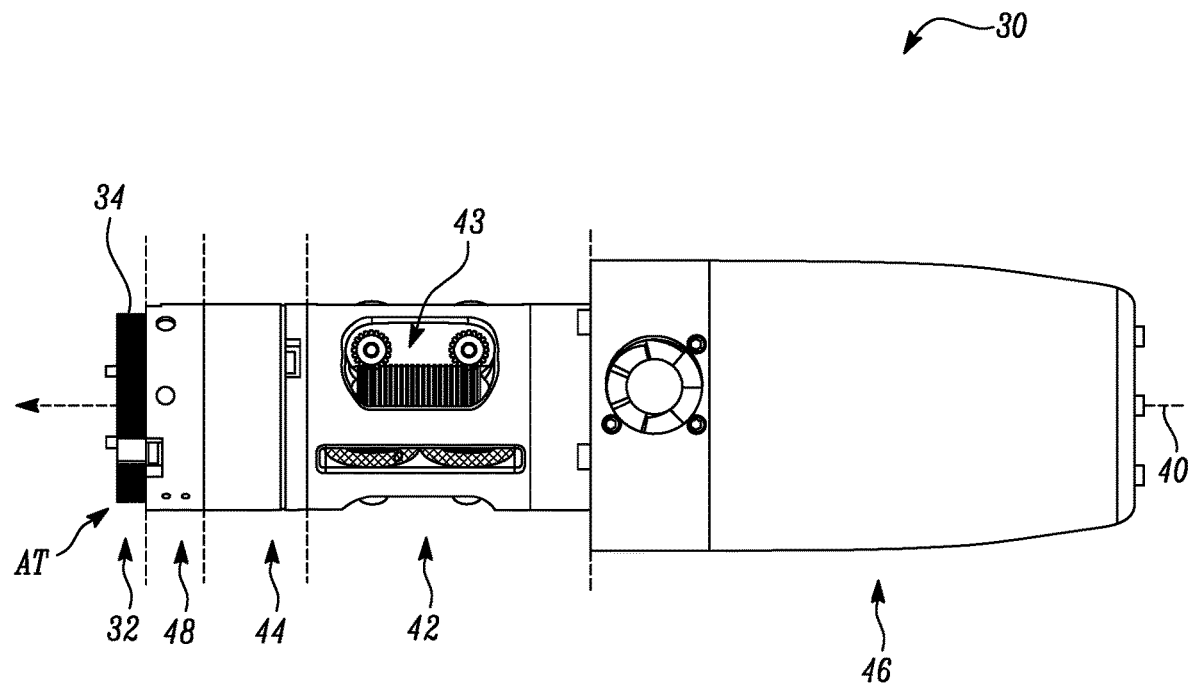
FIG. 3 shows a side perspective view of the mechanism.

With reference to FIG. 3, the mechanism 30 is shown in isolation from the body B, to which the mechanism 30 will be attached, during use. Furthermore, the mechanism 30 is shown in isolation from the elongate member 35, which will be fed into and through the mechanism 30, during use. In the example shown, the mechanism 30 comprises a feed portion 42 and a twist portion 44. Additionally, the mechanism 30 comprises an actuator section 46. Furthermore, the example shown comprises a sensor section 48, and the integral flange 32 comprising a threaded portion 34 forming the attachment means AT.

The sensor section 48 comprises any sensors 39 necessary for the operational requirements of the mechanism 30, such as, for example, one or more break-beam presence sensors, encoders, optical tracking circuitry, temperature sensors, or any further additional sensors required for the specific application of the mechanism 30. Thus, the sensor section 48 may comprise one or more of a break-beam presence sensor, encoder, optical tracking circuitry, temperature sensor, or any further additional sensors required for the specific application of the mechanism 30. For example, in the present example shown, which is configured for inspection of the intermediate pressure compressor 14 of the engine 10, the sensor section 48 may comprise, for example, optical tracking circuitry, and either or both of one or more sensors and tools configured for monitoring or restoring operational health of the gas turbine engine. Alternatively, in further examples which are configured for medical applications, the sensor section 48 may comprise, for example, optical tracking circuitry, and either or both of one or more sensors and tools configured for monitoring or restoring health of the human or animal body. It will be appreciated that the example shown depicts one of many possible application specific sensor configurations, many of which may be considered as viable alternatives for inclusion within the sensor section 48.

The feed portion 42 comprises a feed actuator 43 configured, in use, to engage with and drive the elongate member 35 along the longitudinal axis 40. The twist portion comprises a twist actuator configured, in use, to engage with the feed portion 42 and rotate the elongate member 35 about the longitudinal axis 40. In the example shown, the actuator section 46 comprises at least two actuators and driving hardware required for transmitting torque independently to the feed portion 42 and the twist portion 44.

Figure 4:
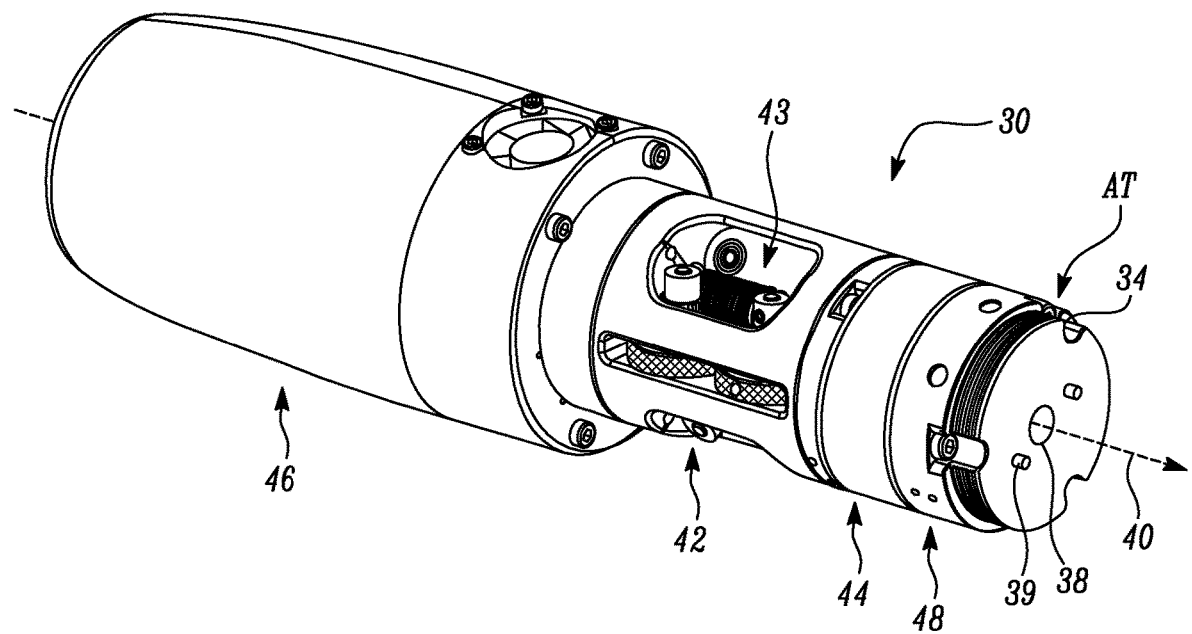
FIG. 4 shows a front perspective view of the mechanism shown in FIG. 3.

With reference to FIG. 4, FIG. 4 shows the mechanism 30 shown in FIG. 3 in an alternate front perspective view, to more clearly show the passageway 38 which extends through the mechanism 30 along the longitudinal axis 40, the threaded portion 34 forming the attachment means AT, and the sensor section 48 comprising one or more sensors 39. In some examples, the sensor section 48 may comprise the attachment means AT.

Figure 5:
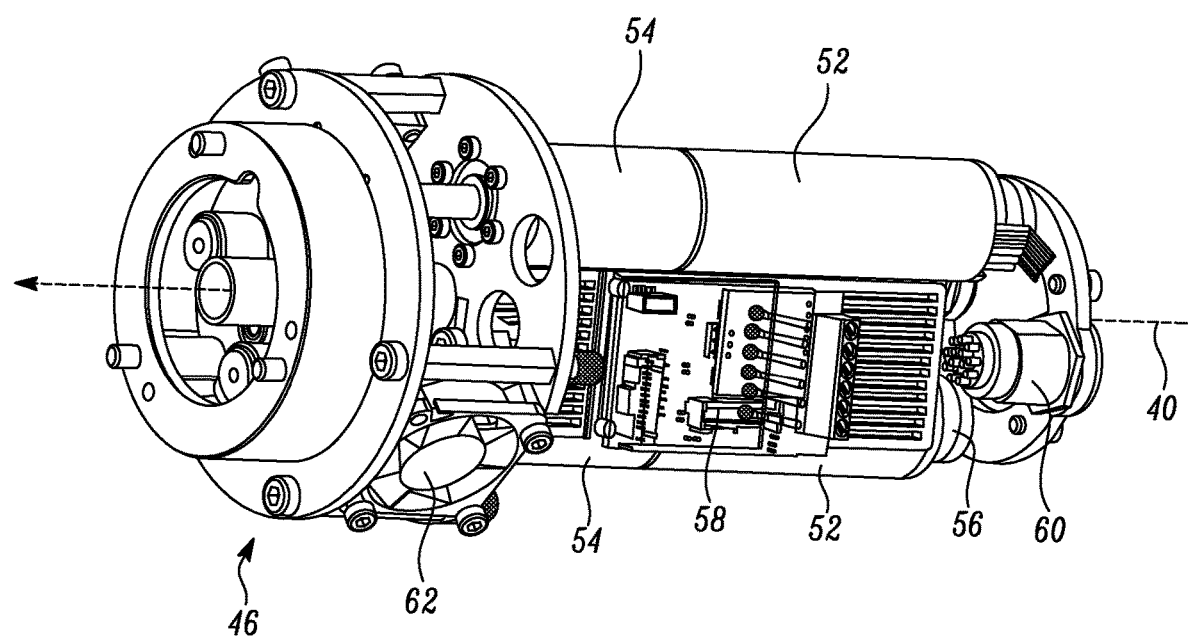
FIG. 5 shows a front perspective view of an actuator portion of the mechanism.

With reference to FIG. 5, an example of the actuator section 46 is shown in isolation from the mechanism 30. In particular, FIG. 5 shows a front perspective view of the actuator section 46. The actuator section 46 shown comprises two motors, and two gearboxes 54. In the example shown, the actuator section 46 comprises two alternating current brushless servo motors 52. Additionally, the actuator section 46 comprises two rotary incremental encoders 56, two servo drivers 58 and two connectors 60. The enclosure for the actuator section may comprise one or more holes 62 for ventilation fans to pull air through the servo driver heat exchangers. It will be appreciated that according to further examples, the actuator section 46 may comprise two or more motors 52. The actuator section 46 may comprise two or more gearboxes 54. Additionally, the actuator section 46 may comprise one or more incremental encoders 56, one or more servo drivers 58 and one or more connectors 60, the specific configuration of which may vary according to application. It will be appreciated that alternate configurations may be envisaged where the component parts forming the actuator section 46 may instead be amalgamated within the feed portion 42 and the twist portion 44, where possible.

Figure 6:
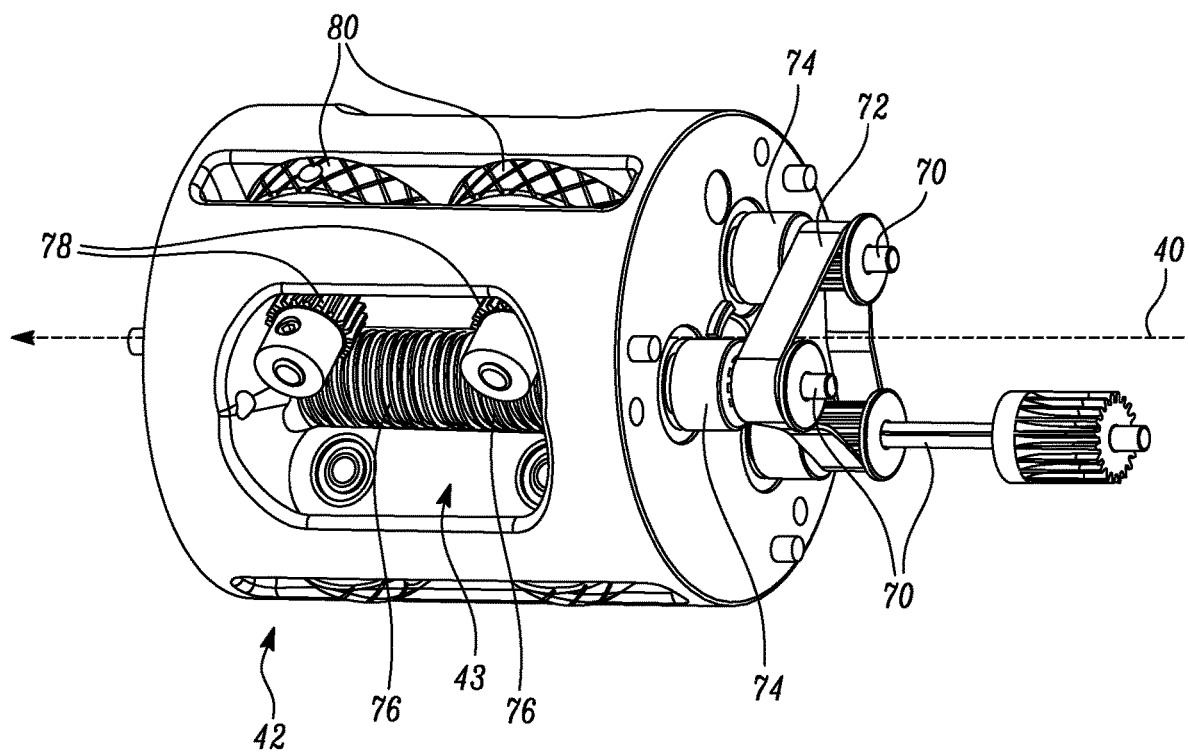
FIG. 6 shows a rear perspective view of a feed portion of the mechanism.

With reference to FIG. 6, an example of the feed portion 42 is shown in isolation from the mechanism 30. In particular, FIG. 6 shows a rear perspective view of the feed portion 42. The feed portion 42 comprises a feed actuator 43 configured, in use, to engage with and drive the elongate member 35 along the longitudinal axis 40. Thus, the feed actuator 43 is configured to drive the elongate member 35 along the passageway 38, the passageway 38 extending through the feed portion 42 and along the longitudinal axis 40. In the example shown, the feed actuator 43 comprises one or more feeding portions. The or each feeding portion is configured about the passageway 38 to engage with and drive the elongate member 35 along the passageway 38. It will be appreciated that many alternate configurations may be provided in order to engage with and drive the elongate member 35 along the passageway 38, such as by using helical or worm gears, or by using rack and pinion, or spur gear configurations.

In the particular example shown, the feed actuator 43 comprises three axial feed shafts 70. Each feed shaft 70 is configured about the passageway 38 such the shafts 70 extend along axes which are parallel to but radially offset from the longitudinal axis 40. Thus, each feeding portion is shown to comprise an axial feed shaft 70. In the example arrangement shown, each of the feed shafts 70 are connected together via pulleys and a belt 72. Each shaft 70 is configured within roller bearings 74 at either side of the respective shaft 70, and comprises two worm gears 76. Each of the six worm gears 76 moves a respective worm wheel 78, configured perpendicularly to the respective feed shafts 70, via a worm wheel shaft 79, to which a wheel 80 is coupled, and which is supported by two roller bearings 81. Thus, each of the worm wheels 78 drives a wheel 80. Accordingly, each feeding portion may comprise one or more wheels. Each wheel 80 comprises a brass hub and a rubber tyre, and is supported by the two roller bearings 81. As shown in FIG. 6, each wheel 80 is configured perpendicularly to the passageway 38 such that a point of engagement between the wheel 80 and the elongate member 35, in use, is parallel to but radially offset from the longitudinal axis 40. Accordingly, a tangent of the or each wheel 80, at the point of engagement between the or each wheel 80 and the elongate member 35, is parallel to, but radially offset from, the longitudinal axis 40. Thus, in use, the wheels 80 may grip the elongate member 35, and rotate, in order to drive the elongate member 35 along the longitudinal axis 40. It will also be appreciated that the wheels 80 are configured to apply sufficient pressure to the elongate member 35 to prevent the wheels 80 from slipping, relative to the elongate member 35, in any given direction.

It will be appreciated that according to further examples, feed actuator 43 may contain three or more shafts 70. Each shaft 70 may comprise one or more worm gears 76, which may drive one or more wheels 80. It will be appreciated that the specific configuration and sizing of each wheel may vary. For example, it will be appreciated that the internal gears may be in the form of a ring gear and spur gear, or equivalent. Thus, it will be appreciated that the specific configuration of the feed portion 42, and particularly that of the feed actuator 43, may vary according to one or more of the application or body B, the nature of the elongate member, and the specific size, thickness, or mechanical properties of the elongate member 35 required for use.

Figure 7:
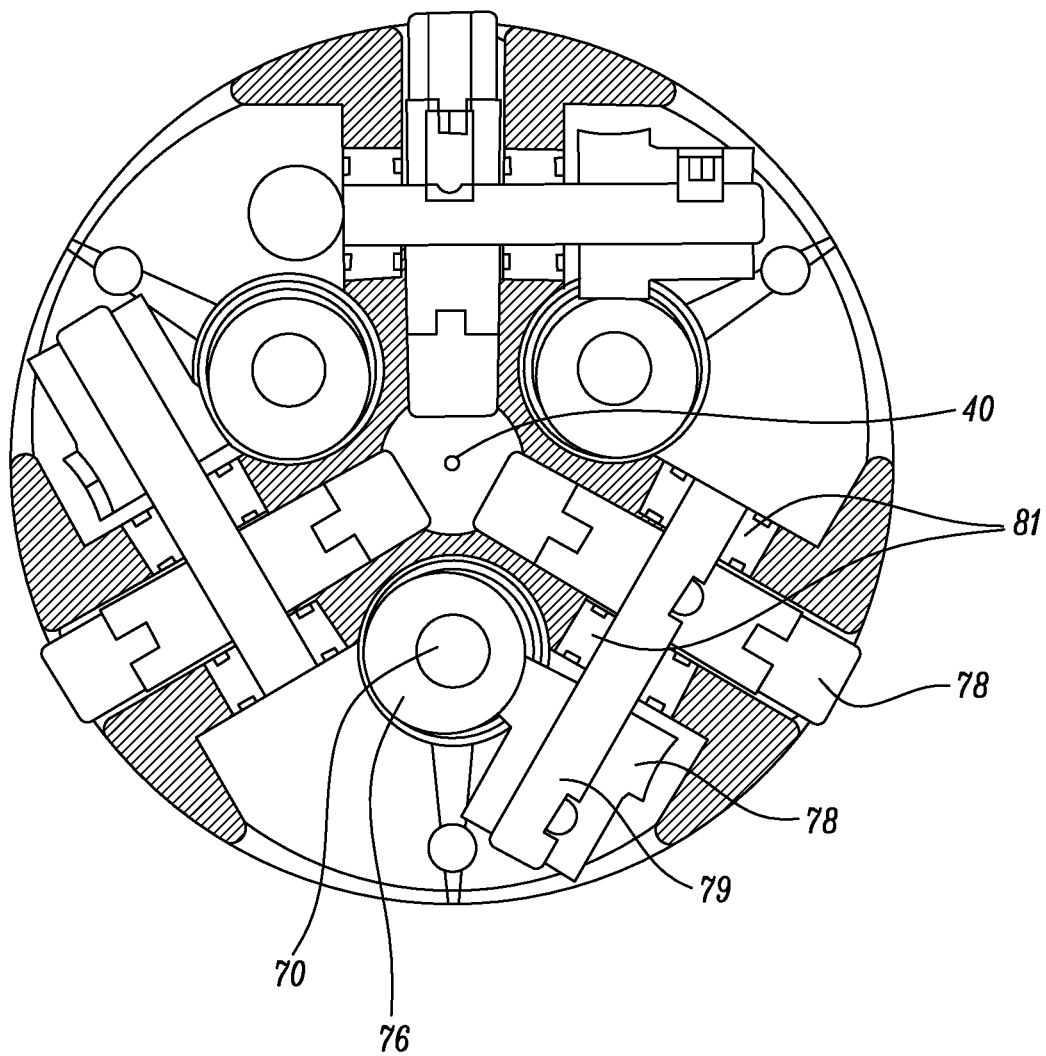
FIG. 7 shows a frontal cross-sectional view of the feed portion of the mechanism.

With reference to FIG. 7, the feed portion 42 of FIG. 6 is shown in isolation from the mechanism 30. In particular, FIG. 7 shows a frontal cross-sectional view of the feed portion 42. As shown, an example configuration of the axial feed shafts 70, worm gears 76, worm wheels 78, and wheels 80 is provided, relative to the longitudinal axis 40.

Figure 8:
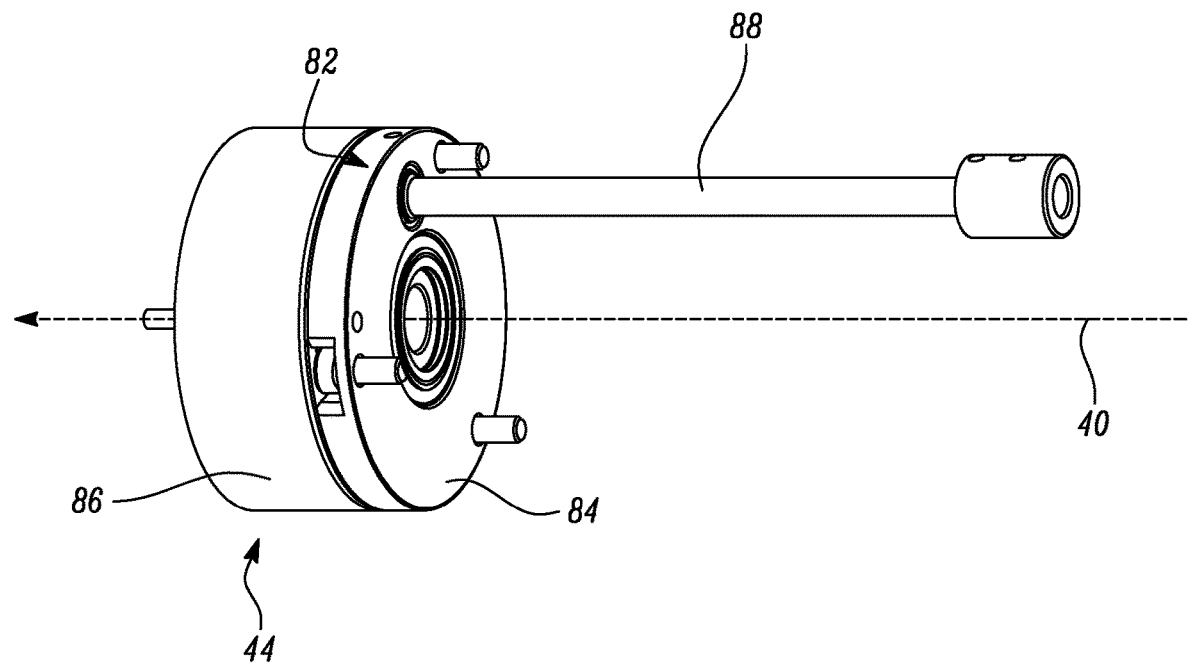
FIG. 8 shows a rear perspective view of a twist portion of the mechanism.

With reference to FIG. 8, an example of the twist portion 44 is shown in isolation from the mechanism 30. In particular, FIG. 8 shows a rear perspective view of the twist portion 44. The twist portion 44 comprises a twist actuator 82 configured, in use, to engage with the feed portion 42 and rotate the elongate member 35 about the longitudinal axis 40. Thus, the twist actuator 82 is configured to rotate both the feed portion 42 and the elongate member 35 about the longitudinal axis 40. In the example shown, the twist actuator 82 comprises a first coaxial portion 84 which is configured to rotate relative to a second coaxial portion 86. In the example shown, the second coaxial portion 86 is configured, in use, to remain stationary relative to the body B and the attachment means AT. Each of the coaxial portions 84,86 are supported, for example, by roller bearings. In the example shown, the first coaxial portion 84 and the second coaxial portion 86 are engaged via a relatively larger internal ring gear which is comprised within and fixedly attached to the second coaxial portion 86, and a relatively smaller internal spur gear which is comprised within the first coaxial portion 84. As per the second coaxial portion 86, the ring gear is configured to remain stationary, in use, relative to the body B and the attachment means AT. The spur gear is fixedly attached to a shaft 88, which is supported by roller bearings. The shaft 88 is coupled to the first coaxial portion 84, the feed portion 42, and the actuator section 46. In the example shown, the shaft 88 is configured to extend at least partially through the first coaxial portion 84, the feed portion 42, and at least partially through the actuator section 46. Thus, in use, rotation of the shaft 88 and spur gear causes the spur gear to interact with the internal ring gear and rotate the shaft 88, first coaxial portion 84, feed portion 42, and the actuator section 46, about the longitudinal axis 40. Thus, the twist portion 44 is configured to rotate the feed portion 42 and the actuator section 46, about the longitudinal axis 40, in use, relative to the body B and the attachment means AT. Accordingly, in use, the twist portion 44 is configured to engage with the feed portion 42, and rotate the elongate member 35 about the longitudinal axis 40.

Figure 9:
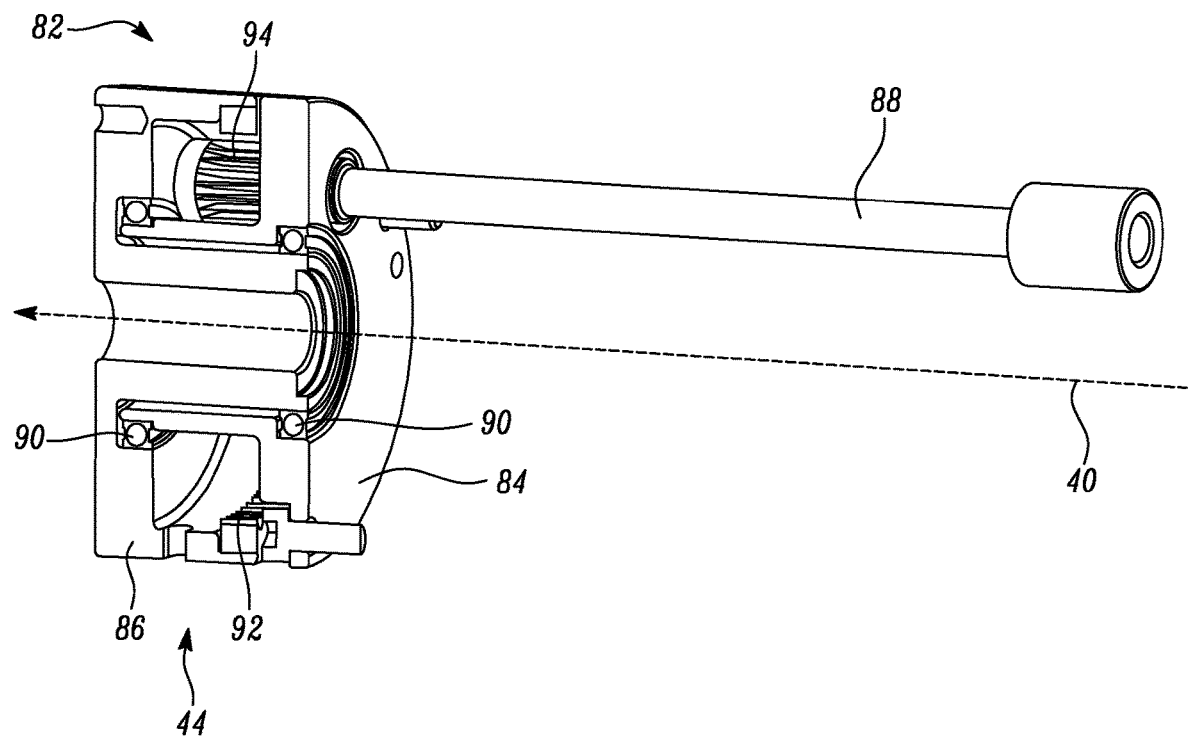
FIG. 9 shows a rear perspective cross-sectional view of the twist portion of the mechanism; and, FIG. 10 shows a method for using the mechanism.
Figure 10:
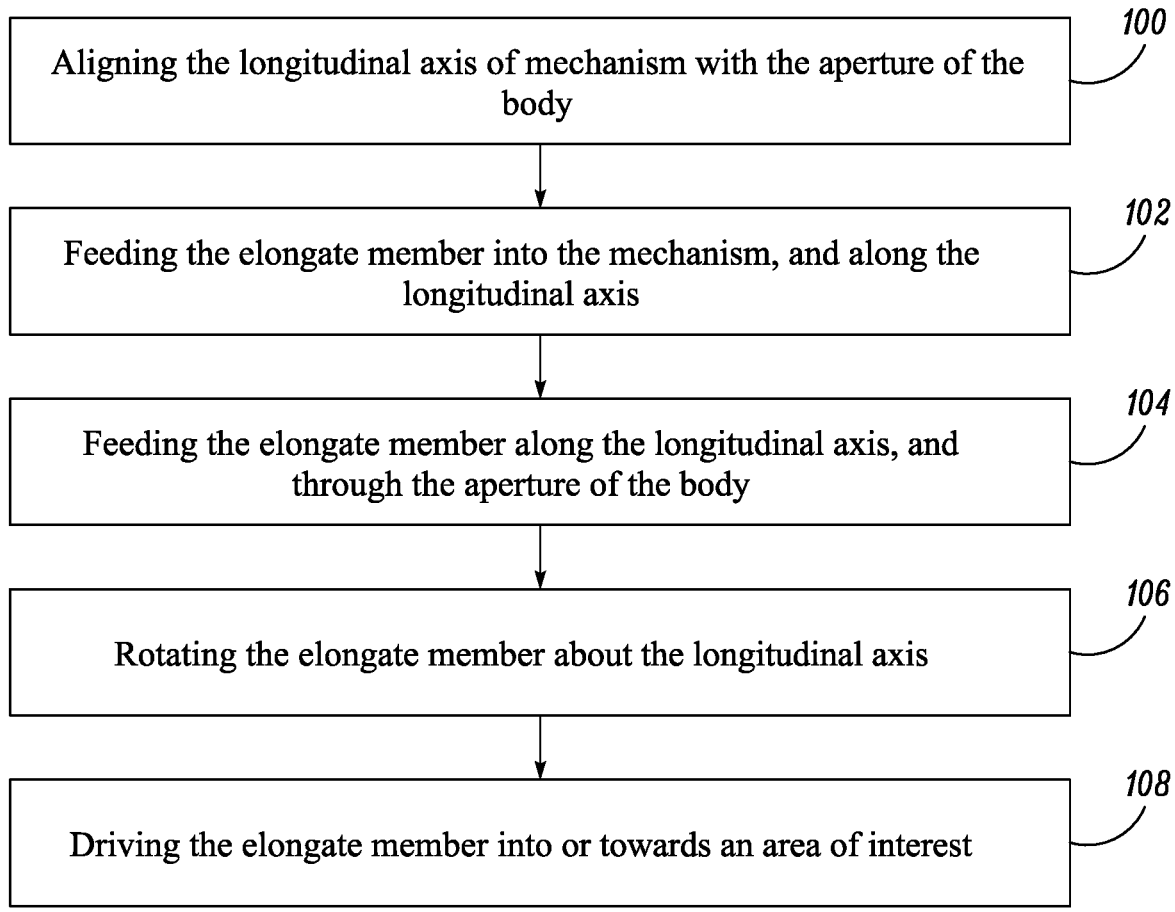

With reference to FIG. 9, the twist portion 44 of FIG. 8 is shown in isolation from the mechanism 30. In particular, FIG. 9 shows a rear cross-sectional perspective view of the twist portion 44, and the twist actuator 82 configured, in use, to engage with the feed portion 42 and rotate the elongate member 35 about the longitudinal axis 40. As shown, an example configuration of the coaxial portions 84,86 and shaft 88 is provided, relative to the longitudinal axis 40. In addition to the example configuration shown in FIG. 8, FIG. 9 also shows an example configuration of the roller bearings 90, the relatively larger internal ring gear 92 comprised within the second coaxial portion 86, and the relatively smaller internal spur gear 94 which is comprised within the first coaxial portion 84, as described in relation to FIG. 8.

It will be appreciated that according to further examples, the twist portion 44, and the twist actuator 82, may contain one or more shafts 88. Each shaft 88 may comprise a relatively smaller internal spur gear 94, which may drive one or more additional internal spur gear. Additionally or alternatively, the second coaxial portion 86 may comprise one or more larger internal ring gears 92. It will be appreciated that the specific configuration and sizing of the internal gears may vary. For example, it will be appreciated that the internal gears may be in the form of a worm gear. Thus, it will be appreciated that the specific configuration of the twist portion 44, and particularly that of the twist actuator 82, may vary according to one or more of the application or body B, the nature of the elongate member, and the specific size, thickness, or mechanical properties of the elongate member 35 required for use. It will also be appreciated that the twist portion 44 is configured to allow for 360 degrees of rotation about the longitudinal axis 40. Thus, the twist portion 44 allows for 360 degrees of rotation of the feed portion 42, and the actuator section 46, about the longitudinal axis 40.

With reference to FIG. 9, there is shown a flow diagram of a method of feeding the elongate member 35 through an aperture A of a body B. As shown, the method comprises a step 100 of aligning the longitudinal axis 40 of the mechanism 30 with the aperture A of the body B. The method may comprise the additional step of coupling or attaching the mechanism 30 to the body B.

The method comprises a step 102 of feeding the elongate member 35 into the passageway 38 of the mechanism 30, and along the longitudinal axis 40. The method may comprise feeding the elongate member 35 into the passageway 38 of the mechanism 30, and along the longitudinal axis 40, until the elongate member 35 brought into contact with a feed actuator 43. Thus, the or each feed actuator 43 is configured to engage with and drive the elongate member 35 along the longitudinal axis 40.

The method comprises a step 104 of feeding the elongate member 35 along the longitudinal axis 40 through the aperture A of the body B. The insertion of the elongate member 35 along the longitudinal axis 40 through the aperture A of the body B may be detected or observed by a sensor comprised within the sensor section 48, or an on-board camera comprised within the elongate member 35.

The method comprises a step 106 of rotating the elongate member 35 about the longitudinal axis 40. The step of rotating the elongate member 35 about the longitudinal axis 40 may be carried out whilst concurrently feeding the elongate member 35 along the longitudinal axis 35. Additionally or alternatively, the step of rotating the elongate member 35 about the longitudinal axis 40 may be carried out independently from the step of feeding the elongate member 35 along the longitudinal axis 35.

The method comprises a step 108 of either or both of feeding the elongate member 35 along, and rotating the elongate member 35 about the longitudinal axis 40, to drive the elongate member 35 into or towards an area of interest 36. Thus, the feed portion 42 and the twist portion 44 may be configured to insert, navigate and orient the elongate member 35 within the area of interest 36, in conjunction with, but independently from, the steering of the elongate member 35.

An operator may control the mechanism 30, whilst feeding the elongate member 35 along the longitudinal axis 40, in a number of different ways. For example, one or two joysticks, either hand or thumb-operated, may be used. Therein, the side-to-side direction on a two-axis joystick or the side-to-side joystick may operate the twist portion 44, and the back-to-front direction on a two-axis joystick or the back-to-front joystick may operate the feed portion 42, or vice-versa. In some examples, the joysticks may be analogue, and may be used to control the velocity of motion of each of the degrees of freedom proportionally to the magnitude of the thumb or hand input. In some examples, the joysticks may be digital, and may be used to control the velocity of motion of each of the degrees of freedom in a binary on-or-off mode with a predefined acceleration. In some examples, this may also be achieved with two momentary push buttons per actuator.

In some examples, a variant of the joystick interface may be utilised, wherein the joystick is mounted on an attachment that may be fastened to a controller that steers a distal end of the elongate member 35. For example, a two-axis analogue joystick may be mounted on a handle and attached to the hand-piece of a video enabled borescope (as per the Mentor Visual iQ VideoProbe™) such that it may be operated together with the joystick that drives the distal end of the elongate member 35 (either with the same hand, or with the other hand, or other thumb). Alternatively, the interface may employ a haptic device, such as a 6-axis haptic device, to control the mechanism 30 in an intuitive way and with tactile feedback. The twist portion 44 may be operated by a twisting action, and feed portion 42 may be operated by a feeding action. Tactile feedback may, in this case, be provided by sensors capable of detecting torque in the actuators or forces going through attachment hardware of the mechanism 30.

Further to the interfaces mentioned above, an operator may control the mechanism 30 from a location remote to the body B. In some examples, one or more of wired, wireless, or internet communication may be used to send instructions and receive sensor data from the mechanism 30. Thus, the operator may drive elongate member 35 to an area of interest 36 from a location remote to the body B that has access to global communication links. Thus, expert technicians may oversee and control the elongate member 35 within the area of interest 36 without travelling to a location proximal to the body B.

It will be appreciated that although particularly suitable for use in a gas turbine engine 10, the mechanism 30 could be used in the medical field. Thus, the mechanism 30 could be used to manipulate an endoscope inside the human body in a repeatable and accurate way. Thus, the body B may be a human or animal body. Alternatively, the mechanism 30 could be used in search-and-rescue operations to navigate a camera into a crevasse or gaps in debris. Alternatively, the mechanism 30 could be used in underwater exploration by aiding in the deployment of long and slender instruments or continuum robots. Alternatively, the mechanism 30 could be used to manipulate space robots for maintenance of satellites or orbiting laboratories. Alternatively, the mechanism 30 could be used in the telecoms industry to manipulate or navigate cables, or cable bundles, or optical fibres, or optical fibre bundles, through underground pipes or passages. Alternatively, the mechanism 30 could be used to manipulate fuel lines for air-to-air or vessel-to-vessel refuelling.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A mechanism for inserting an elongate member through an aperture of a body, along a longitudinal axis, the mechanism comprising:
   an attachment configured to attach, in use, the mechanism to the body;
   a feed portion comprising a feed actuator configured to engage with and drive the elongate member along the longitudinal axis; and
   a twist portion comprising a twist actuator (i) configured to engage with the feed portion and rotate the elongate member about the longitudinal axis and (ii) comprising a first coaxial portion configured to rotate relative to a second coaxial portion configured, in use, to remain stationary relative to the body and the attachment,
   wherein the twist actuator is configured to rotate both the feed portion and the elongate member about the longitudinal axis, and
   the feed actuator comprises three axial feed shafts extending parallel to but radially offset from the longitudinal axis, each of the feed shafts being connected together so as to rotate together.

2. The mechanism as claimed in claim 1, wherein the feed actuator is configured to drive the elongate member along a passageway, the passageway extending through the feed portion and along the longitudinal axis.

3. The mechanism as claimed in claim 2, wherein the feed actuator comprises one or more feeding portions.

4. The mechanism as claimed in claim 3, wherein each feeding portion is configured about the passageway to engage with and drive the elongate member along the passageway.

5. The mechanism as claimed in claim 3, wherein each feeding portion comprises one or more wheels.

6. The mechanism as claimed in claim 3, wherein each feeding portion is configured perpendicularly to the passageway such that a point of engagement between the feeding portion and the elongate member, in use, is parallel to but radially offset from the longitudinal axis.

7. The mechanism as claimed in claim 5, wherein a tangent of the or each wheel, at a point of engagement between the or each wheel and the elongate member, in use, is parallel to, but radially offset from, the longitudinal axis.

8. The mechanism as claimed in claim 1, wherein either or both of the feed portion and the twist portion comprise a sensor.

9. The mechanism as claimed in claim 1, wherein the elongate member comprises a hyper-redundant manipulator.

10. The mechanism as claimed in claim 1, wherein the elongate member comprises a continuum robot.

11. The mechanism as claimed in claim 1, wherein the elongate member comprises a snake arm.

12. The mechanism as claimed in claim 1, wherein the elongate member comprises a borescope or endoscope.

13. The mechanism as claimed in claim 1, wherein the attachment is configured to coaxially align the longitudinal axis with the aperture of the body.

14. A method of feeding an elongate member through an aperture of a body, along a longitudinal axis, using the mechanism as claimed in claim 1, the method comprising:
   coaxially aligning the longitudinal axis with the aperture of the body;
   feeding the elongate member along the longitudinal axis through the aperture; and
   rotating the elongate member about the longitudinal axis.

15. The method as claimed in claim 14, wherein the step of rotating the elongate member about the longitudinal axis is carried out whilst concurrently feeding the elongate member along the longitudinal axis.

16. The mechanism as claimed in claim 1, further comprising a belt that connects together the three axial feed shafts so as to rotate together.

* * * * *